Feb. 1, 1955 — W. PASTUCK — 2,700,844
ANIMAL TRAP
Filed Jan. 15, 1954 — 2 Sheets-Sheet 1
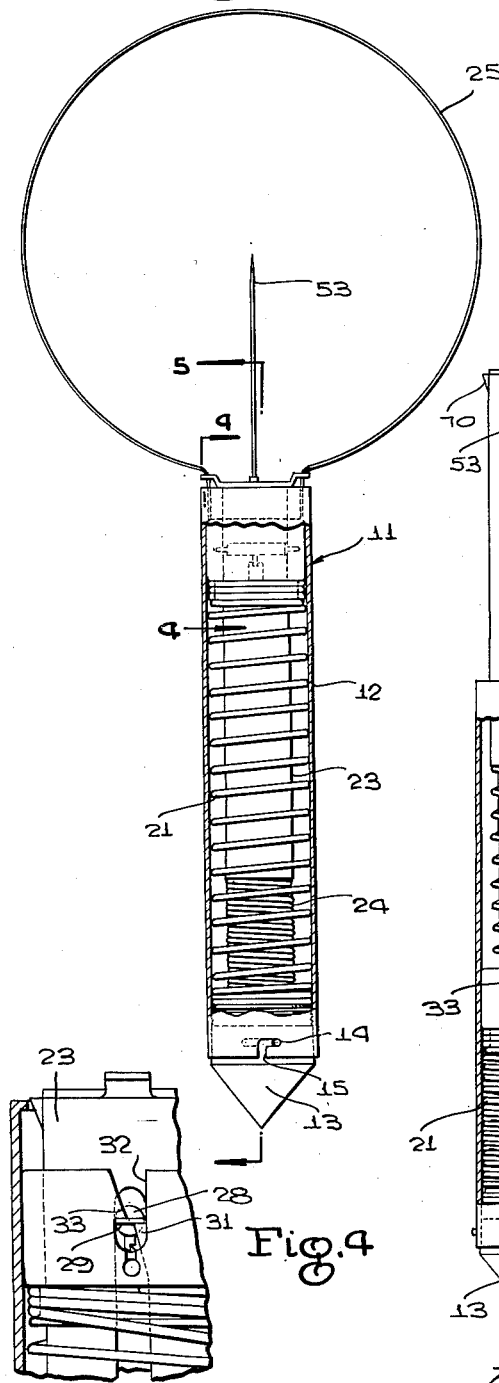
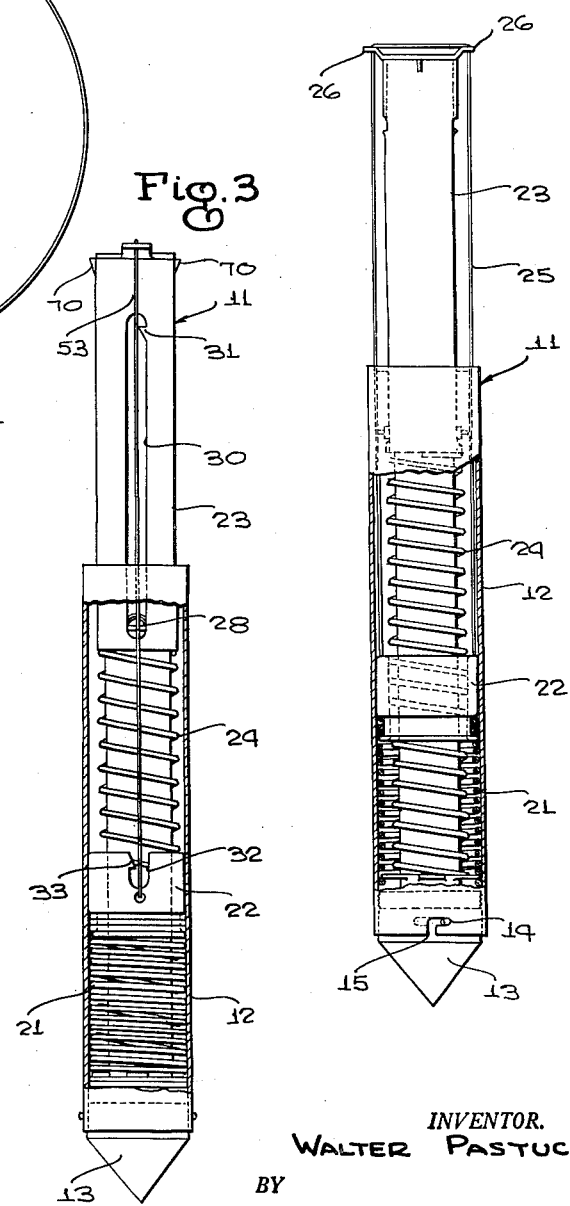
INVENTOR.
WALTER PASTUCK
BY McMorrow, Berman & Davidson
ATTORNEYS.

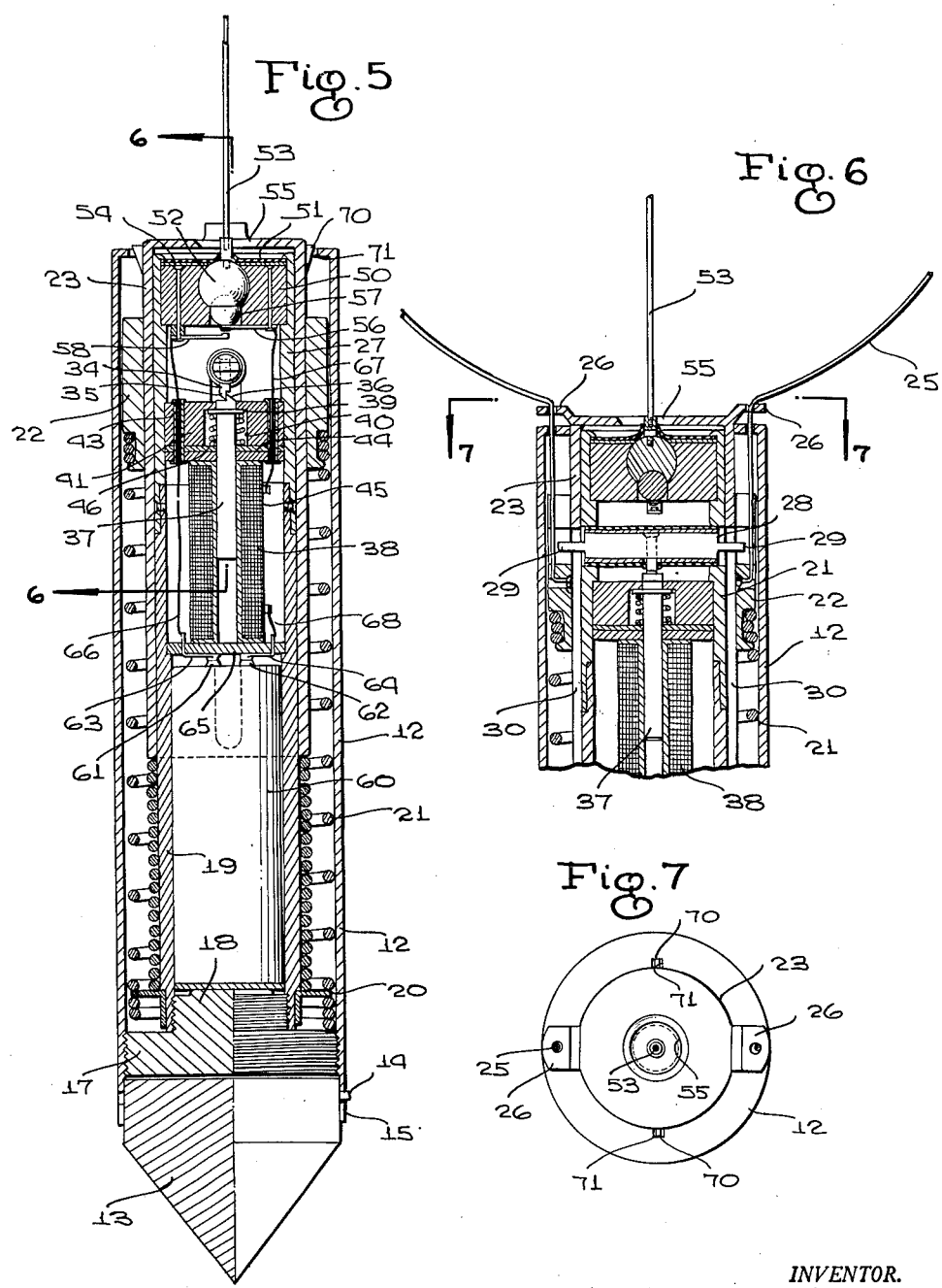

United States Patent Office 2,700,844
Patented Feb. 1, 1955

2,700,844

ANIMAL TRAP

Walter Pastuck, Emerson, N. J.

Application January 15, 1954, Serial No. 404,261

3 Claims. (Cl. 43—87)

This invention relates to improvements in animal traps, and more particularly to an improved animal trap of the electrically operated type.

A main object of the invention is to provide a novel and improved animal trap which is simple in construction, which is easy to set, and which has a very sensitive trigger action.

A further object of the invention is to provide an improved electrically operated animal trap which is inexpensive to fabricate, which is compact in size so that it may be readily hidden, which is light in weight, which is easy to transport, and which is suitable for use either on land or on water and under a wide range of different conditions.

A still further object of the invention is to provide an improved animal trap which may be readily set up for use, which is inconspicuous in appearance, which is very sensitive, and which is arranged to instantly kill the animal entrapped therein to prevent extended suffering of the animal and damage to its fur.

Further objects and advantages of the invention will become apparent from the following description and claims, and from the accompanying drawings, wherein:

Figure 1 is a front elevational view of the animal trap of the present invention, partly in vertical cross section, and shown set for use.

Figure 2 is a front elevational view, partly in cross section, similar to Figure 1, but showing the trap after it has been sprung.

Figure 3 is a side elevational view, partly in vertical cross section, of the trap in the position of Figure 2.

Figure 4 is an enlarged vertical cross sectional detail view taken on the line 4—4 of Figure 1.

Figure 5 is an enlarged vertical cross sectional view taken on the line 5—5 of Figure 1.

Figure 6 is a vertical cross sectional detail view taken on the line 6—6 of Figure 5.

Figure 7 is a horizontal cross sectional view taken on the line 7—7 of Figure 6.

Referring to the drawings, the improved animal trap is designated generally at 11 and comprises a tubular housing 12 provided with a pointed lower end 13 which is slidably received in the housing and which is detachably secured thereto, as by the provision of locking pins 14 on the pointed member 13, said locking pins being lockingly engageable in L-shaped slots 15 provided in the lower marginal portion of the tubular housing 12.

When the pointed bottom member 13 is locked in the lower end of the housing 12, as shown, it provides means for penetrating the ground so that the tubular housing 12 may be driven into the ground and supported in an upright position.

Threadedly engaged in the tubular housing 12 immediately above the detachable pointed end 13 is a plug member 17 having a reduced upstanding central portion 18. Threadedly engaged on the central portion 18 is the lower end of an inner tubular sleeve 19 which is thus supported coaxially inside the tubular housing 12.

Secured on the lower end of the sleeve 19 is the annular flanged collar 20. Secured to the flanged collar 20 is the lower end of a coiled spring 21, for example, as by engaging the flanged collar 20 in the lower turns of the spring as illustrated in Figure 5. The top turns of the spring 21 are lockingly secured to the lower portion of a sleeve member 22 which is slidably mounted inside the tubular housing 12 and which is slidably engaged on a tubular striker plunger member 23, which in turn, is slidably engaged on the upper portion of the inner tubular member 19. The coiled spring 21 is normally tensed, so that it biases the sleeve member 22 downwardly, as viewed in Figure 5. Designated at 24 is a coiled spring which surrounds the lower portion of the inner tubular member 19 and which bears between the flanged collar 20 and the bottom edge of the tubular striker plunger 23, biasing the striker plunger 23 upwardly.

As shown in Figure 5, the spring 24 is received concentrically within the tension spring 21.

Secured to diametrically opposite portions of the sleeve member 22 are the respective ends of a flexible loop 25, the side portions of the loop 25 extending slidably through respective apertured lugs 26, 26 formed on diametrically opposite points of the top wall of the striker plunger 23. The loop 25 is made of suitable flexible material, such as wire or the like, which will normally support itself in an upstanding looped configuration, as shown in Figure 1 but which may be readily deformed to a constricted condition, as shown in Figures 2 and 3.

Secured to the top portion of the inner tubular member 19 is the tubular extension 27. Rotatably mounted in said tubular extension is the transverse latch shaft 28 having the respective flat end lugs 29, 29 projecting from its respective ends and extending through respective vertical slots 30, 30 formed in the striker plunger sleeve 23, as is clearly shown in Figure 6. The slots 30, 30 are formed at the upper portion of one of their edges with the inwardly projecting triangular lugs 31 which are lockingly engageable beneath the flattened lugs 29, 29 to retain the striker plunger sleeves 23 in a depressed position when the lugs 29, 29 are horizontal. Similarly, the sleeve member 22 is formed at its top end with the diametrically opposed notches 32 formed with the inwardly projecting triangular lugs 33, arranged oppositely with respect to the lugs 31, the lugs 33 being engageable with the top surfaces of the flat members 29, 29 to maintain the member 22 in an elevated position when the lugs 29, 29 are horizontal, namely, in the position shown in Figures 1 and 5. As shown in Figure 4, the lugs 33 engage the flat members 29 on the top surfaces of said flat members while the lugs 31 engage the opposite bottom surfaces of the flat members 29, producing a torque tending to rotate the member 28 counterclockwise, as viewed in Figure 4.

Secured to the intermediate portion of the rotatable member 28 is a depending arm 34 which projects perpendicular to the plane of the flat end portions 29, 29, whereby the weight of the arm 34 tends to rotate the member 28 to a position wherein said flat end portions 29, 29 are horizontal. The weight of the member 34, however, is not sufficient to oppose the torque developed by the engagement of the lugs 31 and 33 on the flat elements 29, 29 under the force of the springs 21 and 24. The arm 34 is formed at its end with a beveled detent element 35 which is lockingly engageable with an upstanding beveled detent element 36 formed on the top end of a solenoid plunger 37 which is slidably received in a solenoid 38 axially mounted inside the top portion of the inner tube 19. The top portion of the solenoid plunger 37 is formed with a collar 39 which is slidable vertically in a recess 40 formed in a block member 41 secured in the extension tube 27. The block member 41 is secured by tubular rivets 43 on a pair of partition walls 44 and 45 overlying the solenoid 38 and being centrally apertured to allow the solenoid plunger 37 to slide therethrough. The solenoid plunger 37 is biased upwardly by a coiled spring 46 surrounding the solenoid plunger and bearing between the collar 39 and the partition wall 44, as is clearly shown in Figure 5. As shown in Figure 5, the detent element 36 on the top end of the solenoid plunger 37 is lockingly engageable with the detent element 35 on the arm 34 to hold the arm 34 in a vertical position, and to thus retain the sleeve member 22 elevated and the striker plunger sleeve 23 depressed, as shown in Figures 1 and 5. However, when the solenoid 38 is energized, the solenoid plunger 37 is drawn downwardly, causing the detent element 36 to disengage from the detent element 35, thereby releasing the arm 34, and allowing the shaft 28 to rotate under the force of the springs 21 and 24. This allows the loop 25 to be constricted by the downward movement of the sleeve member 22, while at the same time causes the striker plunger member 23 to move upwardly by the expansion of the spring 24. The top portion of the loop is thus constricted with respect to the top wall of the striker member 23 to snare an animal in the loop, as will be presently described. Designated at 50 is a circular block member which is secured in the top end of the extension tube 27, the block member 50 being preferably of insulating material. The block member 50 is formed with a spherical recess 51 in which is rotatably mounted a ball 52. Secured to the ball 52 and projecting upwardly through a circular gasket 54 secured on the block 50 is the trigger bar 53, said trigger bar extending through a circular, upwardly flaring aperture 55 formed centrally in the top wall of the striker plunger 23. Designated at 56 is a first resilient contact member which is secured to the bottom surface of the block 50 and which underlies a spherical ball 57 received in a central cylindrical recess in the bottom of block 50 and having a portion thereof received in a substantially hemispherical recess formed in the bottom of the spherical ball 52. The spring contact 56 maintains the smaller ball 57 in contact with the inside surface of the hemispherical recess in the larger ball 52.

Designated at 58 is a second resilient contact member which is secured to the block 50 adjacent its bottom surface, opposite the first spring contact 56 and having its inner end portion underlying the inner end portion of the first resilient contact 56, but being normally slightly spaced therefrom. However, when the trigger bar 53 is moved laterally from its normal vertical position, the rotation of the larger ball 52 cams the smaller ball 57 downwardly, causing the spring contact 56 to engage the spring contact 58.

Designated at 60 is a battery which is received in the lower portion of the tubular inner member 19. The respective terminals 61 and 62 of the battery 60 engage respective contacts 63 and 64 secured to a partition member 65 disposed below the solenoid 38. The contact 63 is connected by a wire 66 to the resilient contact element 58. The contact element 56 is connected by a wire 67 to one terminal of the solenoid 38. The other terminal of the solenoid is connected by a wire 68 to the contact element 64. Thus, when the trigger bar 53 is moved from its normal vertical position, the closure of the contacts 56 and 58 completes the energizing circuit for the solenoid 38, causing said solenoid to attract its plunger 37 downwardly, and thereby causing the rotatable shaft member 28 to be released in the manner above described.

The trap may be set by moving the loop 25 upwardly, while at the same time depressing the striker plunger sleeve 23, these elements being moved to their limiting positions until the lugs 31 and 33 on the respective elements interlock with the flat end elements 29 of the shaft 28. The parts will then be in the positions illustrated in Figures 1 and 5. It will be seen from Figure 5 that the shaft 28 will then be held against rotation by the interlocking engagement of the detent elements 35 and 36. When an animal moves the upstanding trigger element 53 from its normal vertical position, the solenoid 38 will become energized, in the manner above described, releasing the shaft 28 and allowing the loop 25 to be constricted downwardly while at the same time allowing the striker plunger member 23 to move upwardly, trapping the animal, and killing the animal by the combined action of the springs 21 and 24.

To insure proper registry of the internal elements of the trap with respect to the external housing member 12, diametrically opposed lugs 70, 70, are provided on the top wall of the striker plunger 23, said lugs being receivable in respective notches 71, 71 provided in the rim of the top wall of the external housing 12, whereby the internal elements of the trap are properly oriented with respect to the housing 12 when the trap is set.

While a specific embodiment of an improved electrically operated animal trap has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A trap comprising a tubular housing adapted to be secured in an upright position, a sleeve member slidably mounted in said housing, spring means biasing said sleeve member downwardly, a flexible loop member secured to said sleeve member and extending from the top of said housing, a striker plunger member slidably mounted in said sleeve member, spring means biasing said striker plunger member upwardly toward said loop member, a movable latch member in said housing lockingly engageable with said sleeve member and striker plunger member, an upstanding trigger member on the top of said housing, and means for moving said latch member to release said sleeve member and striker plunger member in response to movement of said trigger member.

2. A trap comprising a tubular housing adapted to be secured in an upright position, a sleeve member slidably mounted in said housing, spring means biasing said sleeve member downwardly, a flexible loop member secured to said sleeve member and extending from the top of said housing, a striker plunger member slidably mounted in said sleeve member, spring means biasing said striker plunger member upwardly toward said loop member, a movable latch member in said housing lockingly engageable with said sleeve member and striker plunger member, means on said striker plunger member and sleeve member urging said latch member toward release position, electrically controlled detent means engaging said latch member and disengaging therefrom responsive to the energization of said last-named means, an upstanding trigger member on the top of said housing, and means for energizing said detent means to disengage said detent means from the sleeve member and striker plunger member and to release said sleeve member and striker plunger member in response to movement of said trigger member.

3. A trap comprising a tubular housing adapted to be secured in an upright position, a sleeve member slidably mounted in said housing, spring means biasing said sleeve member downwardly, a flexible loop member secured to said sleeve member and extending from the top of said housing, a strike plunger member slidably mounted in said sleeve member, spring means biasing said striker plunger member upwardly toward said loop member, a transversely extending latch member rotatably mounted in said housing, opposed detent lugs on said sleeve member and striker plunger member engageable by said latch member to restrain movement of the sleeve member and striker plunger member, said latch member being rotatable to disengage from said lugs, a solenoid mounted in said housing, a solenoid plunger movably mounted in said solenoid, means on the end of said solenoid plunger lockingly engageable with said latch member to hold the latch member in locking engagement with said lugs, said solenoid plunger being movable out of engagement with said latch member responsive to energization of the solenoid. an upstanding trigger member on said housing, and means for energizing said solenoid responsive to the movement of said trigger member, whereby the latch member is released for rotation, and whereby the sleeve member and striker plunger member are released.

References Cited in the file of this patent

UNITED STATES PATENTS

| | | |
|---|---|---|
| 1,913,893 | Morrill | June 13, 1933 |
| 2,079,825 | Urquhart | May 11, 1937 |
| 2,257,299 | Herstedt | Sept. 30, 1941 |
| 2,479,196 | Anderson | Aug. 16, 1949 |